United States Patent

Feucht et al.

[15] 3,689,889

[45] Sept. 5, 1972

[54] SWITCHING MATRIX FOR RELAY COUPLERS WITH THRESHOLD VALUE SWITCHES

[72] Inventors: Hermann Feucht, Farchanterstrasse 59, 8000 Munich 55; Ulrich Korber, Passauerstrasse 50, 8000 Munich 25, both of Germany

[22] Filed: Feb. 7, 1969

[21] Appl. No.: 797,561

[30] Foreign Application Priority Data

Feb. 9, 1968 Austria ..................A 1260/68

[52] U.S. Cl. ..........................340/166 R, 340/147 R

[51] Int. Cl. ..............................................H04q 3/00

[58] Field of Search........................................340/166

[56] References Cited

UNITED STATES PATENTS

| | | | |
|---|---|---|---|
| 3,392,373 | 7/1968 | Rouzier | 340/166 |
| 3,456,084 | 7/1969 | Haselton | 340/166 X |
| 3,535,692 | 10/1970 | Papke | 340/166 |
| 3,280,267 | 10/1966 | Feucht | 340/166 |
| 2,949,600 | 8/1960 | LeMay | 340/166 |
| 2,992,410 | 7/1961 | Groth | 340/166 |
| 3,014,202 | 12/1961 | Hanewinkel | 340/166 |
| 3,054,985 | 9/1962 | Mason | 340/166 |
| 3,107,341 | 10/1963 | Ulmer | 340/166 |

*Primary Examiner*—Harold I. Pitts
*Attorney*—Birch, Swindler, McKie & Beckett

[57] ABSTRACT

A switching matrix with threshold value switches connected between the junctions of row and column lines, the threshold value switches being responsive to the temporary application of a sufficiently high operating potential to the associated row and column lines to close or become conductive. Individual pre-resistance means are connected to the row and column lines which have a small value of resistance compared to that of the threshold value switches in blocked or open condition. Control potentials are applied over the threshold value switches in blocked condition to further threshold value switches. Each of the latter are connected to at least one of a row and column line not receiving the operating potential to decrease the effect of the operating potential thereon to an extent such that the further threshold value switches cannot close.

9 Claims, 4 Drawing Figures

PATENTED SEP 5 1972 3,689,889

SWITCHING MATRIX FOR RELAY COUPLERS WITH THRESHOLD VALUE SWITCHES

CROSS REFERENCE TO RELATED APPLICATION

Applicants claim priority from corresponding Austrian application Ser. No. A 1260/68, filed Feb. 9, 1968.

FIELD OF THE INVENTION

The present invention relates to a switching matrix having threshold value switches connected between row and column lines that are operative in response to the temporary application of a sufficiently high operating potential to the associated row and column line. It has particular utility in the telephone and telegraphy arts, for example, but is not limited thereto.

DESCRIPTION OF THE PRIOR ART

Switching matrices of this kind are already known note German Pat. publication DPS No. 229,916 and "-Handbook of Picture Telegraphy and Television," by Friedrich Schroeter, ( 1932) pp. 56 and 57. If the threshold value switches in the form of glow lamps are used, the switching matrix represents an image field wherein through appropriate switching of the threshold value switches, images can be produced. If, relays are connected in series with the individual threshold value switches, a switching matrix results which is developed the same as known relay couplers (see, German Pat. publication DPS No. 1,075,675, FIG. 1); however, the otherwise provided decoupling rectifiers are replaced by the threshold value switches. In the operation of such a switching matrix it is evident, however, that there is a possibility that the threshold value switches might close in a manner not contemplated. This danger is especially great if the number of rows is very much different from the number of columns.

An unintended switch closure can be avoided if the tolerance for the operation of the threshold value switches is sufficiently narrow. However threshold value switches which possess especially narrow tolerances are, of course, accordingly high in cost. It therefore often happens that because of cost or other technical reasons, a switching matrix of the kind desired cannot be produced in which threshold value switches can be used in operationally reliable fashion.

SUMMARY OF THE INVENTION

The invention shows a way as to how these difficulties can be overcome. In using the invention even in the case of switching matrices wherein the number of rows is very much different from the number of columns, relatively large tolerances for the threshold value switches are permissible. Further when the switching matrix is square, much larger tolerances than ordinary are permissible. The relative cost is proportional to the sum of the number of rows and columns and therefore becomes less significant the larger the number of threshold value switches utilized, because the number thereof equals the product of rows and columns.

The invention provides a switching matrix with threshold value switches connected across the junctions of row and column lines and which are operative in response to the temporary application of a sufficiently high operating potential to an associated row and column line to switch through. The switching matrix according to the invention, is characterized by the fact that control potentials are applied to the row and column lines over individually connected pre-resistors. The resistances of the latter are low compared to the resistances of the threshold value switches in blocked or open condition. The control potential reduces the effect of the operating potential over the threshold value switches in blocked condition on threshold value switches connected to a row and/or column line to which no operating potential is applied so that the latter threshold value switches cannot close. Due to the fact that only pre-resistors which are individually connected to the row and column lines are required, the cost remains relatively low. Further because the control potentials are applied over the pre-resistors, and the effect of the operating potential is reduced, the threshold value switches can have greater tolerances than otherwise.

The magnitude of the control potential can vary. Thus, for example, it can be equal to half of the operating potential, or when a certain switching technique is used, to one or two thirds of the full operating potential. As already mentioned, glow lamps can be used as threshold value switches. However, blocking-layer-free symmetrical semiconductor switching elements can also be used. These are especially advantageous if they have to control flip-flop relays connected in series therewith.

It is already known in the case of a switching matrix in the form of a relay coupler with decoupling rectifiers to couple grid potentials to the row and column lines over individual pre-resistors ( See German Pat. publication DPS No. 1,075,675, FIG. 2). However no threshold value switches are provided in this type of switching matrix. Therefore the control potentials applied thereto have a purpose which is completely different from that of the invention. Thus in the known relay coupler, they serve to guarantee the development of the there employed selenium rectifiers. For this reason these pre-resistors cannot be compared to those used in the invention.

DETAILED DESCRIPTION OF THE INVENTION

Figure 1:
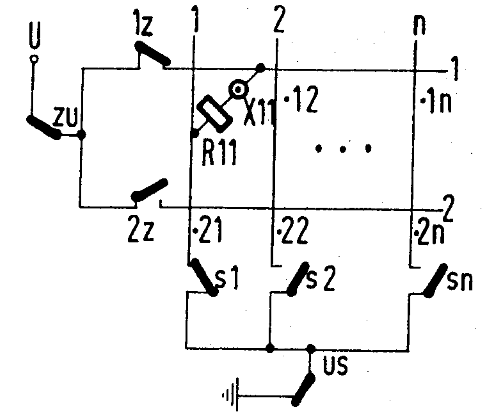
FIG. 1 shows a switching matrix with threshold value switch wherein there are no pre-resistors.

In the switching matrix without pre-resistors but with threshold value switches shown in FIG. 1, the number of rows is very much different from that of columns; there are two rows and $n$ columns, whereby $n$ is larger than 2. The operating potential U/ ground is conveyed over connections $zu$ and $us$. It is temporarily and selectively applied to a row and column line through contacts $1z$ and $2z$ of the row lines and contacts $s1 \ldots sn$ of the column lines. In the switching matrix shown in FIG. 1 contacts $1z$ and $s1$ are closed, so that the full operating potential has effect on threshold value switch X11 over relay R11 connected in series therewith between row and column lines 1. The threshold value switches and relays connected across the other junctions of row and column lines are only indicated by dots and indices of their designation, but it is to be understood that these elements are present. Thus, for example, the point between row 2 and column 2 is designated by 22.

Figure 2:
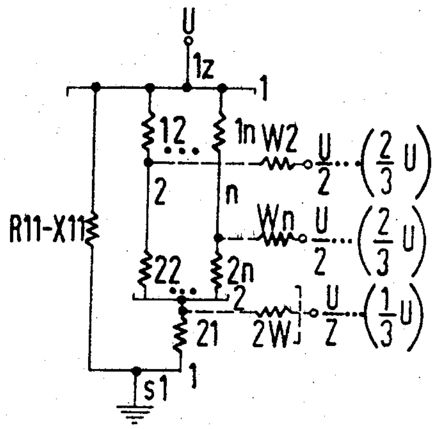
FIG. 2 serves to illustrate the potential distribution in the switching matrix in a certain case of operation.

In FIG. 2 which serves to illustrate the potential distribution occurring in the above described operational case, a threshold value switch, including the thereto pertaining relay, is in each case represented by a resistor. Thus, with respect to relay R11 and threshold value switch X11, resistor R11–X11 pertains thereto. The rest of the resistors of FIG. 2 are only designated by the indices placed at the mentioned dots. The respective assignment should be clearly evident. From row line 1 to which potential U is placed there first leads a current path over resistor R11–X11 to column 1. From row line 1 there leads a further current path over resistor 12, column line 2 and resistor 22 to row line 2. There further leads to that point a current path over resistor 1*n*, column line *n* and resistor 2*n*. The current paths assigned to the rest of the column lines are not shown in FIG. 2. In any event there is a total of $n-1$ current paths proceeding in parallel fashion.

All of these current paths proceed from row line 1 jointly over resistor 21 to column line 1. The total resistance of the mentioned, parallel-connected current paths is now evidently very small as compared to resistor 21. It follows that the potential at resistor 21 is almost exactly as large as the full operating potential at resistor R11–X11. If therefore the full operating potential U/ ground is applied to row line 1 and column line 1, the switching through only of threshold value switch X11 can be achieved only if the threshold value potential of the threshold value switches lies between the full operating potential and the potential at resistor 21. However the difference between these two potentials is very small. This means that for the threshold value potential only a very small tolerance is also available, and the tolerance is smaller the larger the number of columns.

If more than two rows are provided there are still additional current paths in the switching matrix by which the voltage drop at resistor 21, and thereby the danger of a false through-switching, is decreased. For reasons of symmetry it is evident that only when the switching matrix is square ( the number of rows is equal to the number of columns) is the potential at resistor 21 smaller than half of the operating potential. That is, in a square switching matrix corresponding to FIG. 2, the current paths which exist between that column line and that row line to which operating potential is applied, is symmetrical with reference to these lines. As a consequence, at most half of the operating potential is available for the potential drop at resistor 21. Thus in this case there also corresponds thereto a resistor connected to row 1 and assigned to a threshold value switch not to be switched through.

If, according to the invention, with the aid of pre-resistors it has been assured from the beginning that the potential appearing at a threshold value switch which is not to be closed is limited in such a way that it practically does not exceed half of the operating potential, then also those switching matrices wherein the number of rows is very much different from that of the columns, are protected against false closure of threshold value switches.

Figure 3:
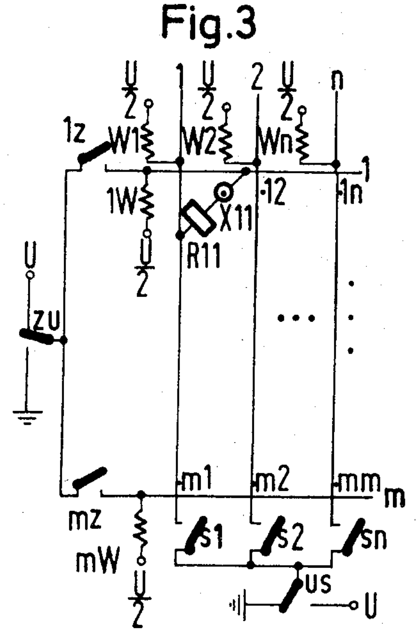
FIG. 3 shows a switching matrix which is equipped with pre-resistors according to the invention, wherein control potentials are applied which equal one or two thirds of the operating potential.

Such a switching matrix is shown in FIG. 3. There threshold value switches are provided which possess a threshold value potential $U_s$, which is higher than half of the operating potential and lower than the full operating potential U. Suitably the threshold value potential will thus here equal (¾ U). The control potential is then in each case equal to half of the operating potential. With their free ends, the pre-resistors are connected to half the operating potential or ½ U. To column lines 1 . . . *n*, pre-resistors W1 . . . W*n* are respectively connected, which also are connected at their free ends to half the operating potential or ½ U. As for the rest, this switching matrix is developed the same as that shown in FIG. 1. It now however possesses *m* rows instead of two.

The influence which the control potential applied over the pre-resistors has on the potential distribution can also be recognized with the aid of the already described FIG. 2. Pre-resistors W2 . . . W*n* to be considered for a switching matrix with two rows are inserted there and connected over dotted lines with the positions in question. These pre-resistors possess a smaller resistance than the threshold value switches in blocked condition. Therefore on resistor 21 representing a threshold value switch, only one potential now has effect, which practically equals half of the operating potential. Thus to the heretofore existing current paths additional ones have been added, which lead over these pre-resistors. If these pre-resistors are small compared to the resistance of the threshold value switches in blocked condition, there exists at the connection points between resistors 12 and 22 . . . , 1*n* and 2*n*, as well as at the connection point of resistors 22, . . . 2*n* and 21, practically half of the operating potential.

Therefore the potential drop at resistor 21 also practically does not exceed half of the operating potential. The threshold value switch assigned thereto, for which otherwise the danger exists that it erroneously also switches through, is now protected against this danger. This protection, accordingly, exists also if the switching matrix has more than two row lines. Correspondingly in each instance the threshold value switches assigned to resistors 12, . . . , 1*n* are also protected. The distribution of the operating potential thereon unto the different threshold value switches is, under the influence of the control potential, no longer dependent solely on the resistance of the threshold value switches in blocked condition. Therefore for these resistors there is also a greater permissible tolerance than otherwise. This is also true if the number of rows is not very different from that of columns.

Figure 4:
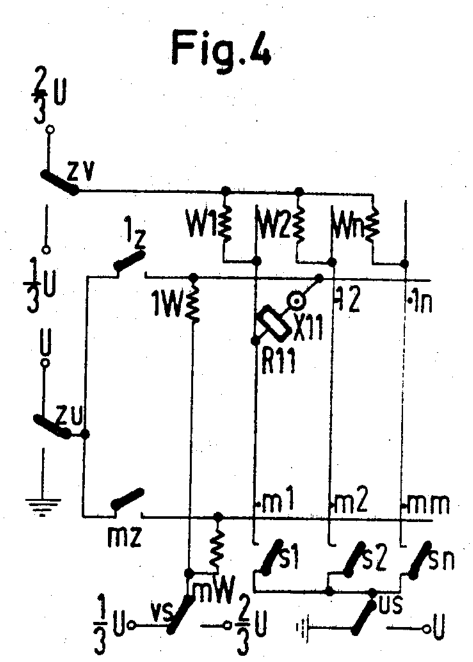

In FIG. 4 switching matrix is shown wherein the grid or control potential applied over pre-resistors to series connected lines of the same type ( row or column lines) is changed by two thirds as compared to the operating potential applied to series lines of the same type for the switching through of a threshold value switch. Thereby the control potential applied to a row line is reduced by two thirds as compared to the operating potential applied otherwise, but the control potential applied to a column line is increased by two thirds as compared to the operating potential applied otherwise.

The magnitudes of these potentials are also indicated in FIG. 4. In a given case, potential U, applied to operating potential connection *zu* is applied to a row line. However, over pre-resistors 1W . . . *m*W potential ⅓ U, reduced by two thirds as compared thereto, is applied. In contrast, in a given case, ground potential at operating potential connection *us* is applied to a column line. However over pre-resistors W1, W2 . . . W*n* voltage ⅔ U, increased by two thirds, is applied. As for the rest, the switching matrix shown in FIG. 4 is in agreement with that shown in FIG. 3.

With the aid of FIG. 2 it may be explained what effect the application of these grid potentials has in the operation of the switching matrix. There also the control potentials applied over pre-resistors W2 . . . W*n* and 2W are indicated in parentheses, if the switching matrix is as in FIG. 4. The current branches existing when two rows and *n* columns are provided as shown. Considering the explanation already given in connection with FIG. 3 it is recognized that in this case at resistor 21 and at resistors 12 . . . 1*n* one-third of the full operating potential is applied. At the remaining resistors a similar voltage of the same magnitude exists. Only at resistor R11 – X11, which is assigned to the threshold value switch is to be switched through, does the full operating voltage exist.

The entire operating potential available is therefore distributed equally unto the individual resistors of the series connections consisting of three resistors each. Such a distribution also results, among other things, for reasons of symmetry if the switching matrix has three row lines instead of two row lines. Even if still more row lines are present, it is prevented, due to the fact that the potentials which appear at such row lines and column lines to which operational potential is not directly applied, are limited in their magnitude such that the potential appearing at a threshold value switch aside from that to be switched through becomes larger than one-third of the full operating potential.

A switching matrix with control potentials such as those according to FIG. 4, therefore exhibits in any case more favorable operating properties than a switching matrix control without potential, even if it is a square switching matrix. Accordingly, in a switching matrix according to FIG. 4, larger tolerances than otherwise are permissible for the threshold value switches used; that is, with regard to the threshold value potential and the resistances in blocked condition. The threshold value potential of the threshold value switches must only be higher than one-third of the operating potential and lower than the full operating potential.

It is already known to use glow lamps as threshold value switches. In the case of such threshold value switches one must count on the fact that they only permit current flow in one direction. Accordingly, switching elements controlled thereby, unless additional measures are provided, can only receive current in unipolar fashion. However there are already known threshold value switches which are developed differently and which possess a threshold for the one as well as for the other possible current direction. These are for example, blocking-layer-free symmetrical semiconductor switching elements ( See German Pat. publication DAS Nos. 1,219,076 and 1,224,358; Netherland Pat. applications Nos. 6,615,850 and 6,508,411). If threshold value switches of this type are used, it is possible to apply the operating potential, and in a given case the grid potentials, to the switching matrix selectively in unipolar fashion. It can then be achieved that, through the switching elements controlled by threshold value switches, depending on the case, a current is transmitted in one or the other direction.

In this regard, in the switching matrix shown in FIG. 3, only the operating potential is to be applied with one or the other polarity over the operating potential connections *zu* and *us* which are developed as contacts. If these contacts are placed into operating condition then, upon the application of operating potential to column 1 and row 1 by means of contacts *s*1 and 1*z*, a current is applied to threshold value switch X11 and switching element R11 connected in series therewith in a direction different than otherwise.

The corresponding measure can also be provided in the switching matrix according to FIG. 4. Here too the operating potential is applied through contacts *zu* and *us* with a polarity different than otherwise. Since here the grid potential is not exactly equal to half of the operating potential, and is thereby independent of the polarity of the operating potential, but since grid potentials are applied which are equal to one-third and two-thirds of the full operating potential, it is further necessary to also commutate the grid potentials accordingly. Contacts *zv* and *vs* are provided for this purpose.

Due to the symmetry which also exists with regard to the magnitude of the grid potentials, it is only necessary that the grid potentials applied over the pre-resistors be exchanged among one another. Accordingly, if the polarity of the operating potential is changed, due to the fact that contacts *zv* and *vs* are actuated into working position, grid potential ⅓ U is now applied to the column lines, and grid potential ⅔ U to the row lines. The operation of the switching matrix is then just as otherwise, and only with regard to the potentials applied, the roles of the column lines and row lines are switched. At the threshold value switches not to be closed, therefore there too only one potential appears which is not larger than one-third of the full operating potential.

The switching element in each case controlled by a threshold value switch can also be developed as flip-flop relay. Then the flip-flop relay can in each case be made to respond to a current pulse in the opposite direction, which is attainable after the changing of the polarity of the applied operating potential. The winding of such a flip-flop relay and the thereto pertaining threshold value switch then connect, in series, in each case a row and a column line at a junction. The internal resistance of a switching element controlled by a threshold value switch must be low as compared to the value of resistance of a pre-resistor in order to assure than no impermissible shunt to a switching element is caused by a pre-resistor. It has been shown, for example, that when utilizing threshold value switches with a blocked condition of about 1 megohm and of thereby controlled switching elements with an internal resistance of about 50 ohms, pre-resistors can be used having a resistance of 1 k-ohm.

We claim

1. A switching matrix having threshold value switches energized by an operating potential for completing connections across the junctions of row and column lines in said matrix, each said threshold value switch being changed from a non-conductive to a conductive condition by the application thereto of a potential having a predetermined minimum value over the row and column lines associated therewith, comprising:

individual pre-resistance means 1W . . . *m*W; W2 . . . W*n* connected to each of said row and column lines, said pre-resistance means having a resistance value that is small relative to the values of said threshold value switches in their non-conductive conditions, and means for applying control potentials to said row and column lines through said pre-resistance means, said control potential being of a value within the range of said operating potential, but lower than said predetermined minimum value, thereby reducing the effect of said o perating potential on ones of said threshold value switches connected to row and column lines to which no operating potential is applied so that said operating potential cannot cause the ones of said threshold values switches connected to row and column lines to which said operating potential has not been applied to change a conducting state.

2. A circuit arrangement as recited in claim 1, wherein the number of rows is substantially different from the number of columns, and said predetermined minimum potential U*s* of the threshold value switches X11, . . . is more than one-half and the control potential is equal to one-half of the operating potential U.

3. A circuit arrangement as recited in claim 1 wherein said predetermined minimum potential U*s* of the threshold value switches X11, . . . is more than one-third (⅓ U) of the operating potential U and less than the full operating potential U, and the control potential (⅔ U or ⅓ U) is applied over the pre-resistors 1W, . . . , *m*W; W1, W2, . . . , W*n* to series connected row or column lines and is changed by two-thirds compared to the operating potential U, or ground applied to the row or column lines connected in series for the switching through of a threshold value switch X11.

4. A circuit arrangement as recited in claim 1 wherein the threshold value switches X11, . . . comprise glow lamps.

5. A circuit arrangement as recited in claim 1 wherein the threshold value switches X11, . . . comprise blocking-layer-free, symmetrical semi-conductor switching elements.

6. A circuit arrangement as recited in claim 5 wherein the operating potential applied to the switching matrix and the control potentials may selectively be of one or the other polarity.

7. A circuit arrangement as recited in claim 5 wherein the operating potential applied to the switching matrix may selectively be of one or the other polarity.

8. A circuit arrangement as recited in claim 6 wherein an individual switching element comprising a holding relay is controlled by each threshold value switch.

9. A circuit arrangement as recited in claim 1 further comprising:

a controlled switching element R11 connected in series with each threshold value switch X11 between the junctions of associated row and column lines having a value of internal resistance that is small compared to the value of resistance of the pre-resistors.

* * * * *